Jan. 28, 1964   A. J. MALECKI   3,119,591
HINGED JOINT SUPPORT, AS FOR A REAR VIEW MIRROR MOUNTING
Filed June 4, 1963   4 Sheets-Sheet 1

INVENTOR.
ALEXANDER J. MALECKI
BY Howson & Howson
ATTYS.

Jan. 28, 1964   A. J. MALECKI   3,119,591
HINGED JOINT SUPPORT, AS FOR A REAR VIEW MIRROR MOUNTING
Filed June 4, 1963                                   4 Sheets-Sheet 3

INVENTOR.
ALEXANDER J. MALECKI
BY Howson & Howson
ATTYS.

Jan. 28, 1964  A. J. MALECKI  3,119,591
HINGED JOINT SUPPORT, AS FOR A REAR VIEW MIRROR MOUNTING
Filed June 4, 1963  4 Sheets-Sheet 4

INVENTOR.
ALEXANDER J. MALECKI
BY Howson & Howson
ATTYS.

United States Patent Office 3,119,591
Patented Jan. 28, 1964

3,119,591
HINGED JOINT SUPPORT, AS FOR A REAR VIEW MIRROR MOUNTING
Alexander J. Malecki, Warminster, Pa., assignor to Delbar Products, Inc., Perkasie, Pa., a corporation of Pennsylvania
Filed June 4, 1963, Ser. No. 285,431
24 Claims. (Cl. 248—282)

This invention relates to a hinged joint support, as for a rear view mirror mounting, especially for trucks, buses and the like, and has for an object the provision of improvements in this art.

This invention is a continuation-in-part of my copending applications Serial No. 163,549, filed January 2, 1962, and Serial No. 210,108, filed July 16, 1962, both now abandoned.

The invention relates particularly to an improved joint construction for a mirror support which swings in and out.

Mirrors for trucks and buses often extend so far out on the side that they may encounter obstructions alongside the vehicle or may be in the way when a door is opened. It is a common practice to mount the mirror support on a hinged joint so it can be swung in out of the way and then swung back out for use. In some forms of joint there are angularly spaced notches, detents or the like for holding the mirror support more securely at these angularly spaced positions. The holding elements, for example, may be spaced thirty degrees apart. If the driver moves the mirror in to clear an obstruction and then moves it back out he may stop it at the wrong notch. Then when he drives on the highway he may not be able to adjust it properly, especially if it is on the off side more distant from him and this can well cause accidents.

It is one of the objects of the present invention to provide an arrangement which assures that the support will always stop in the proper position when pushed out.

Another difficulty with the fixed notch arrangement is that there may be no notch which will locate the mirror exactly where it is wanted. That is to say, when for example, the notches are thirty degrees apart, there may be intermediate positions between notches which could be used to advantage but cannot be used because the parts will not remain in this position in service.

Another object, then, is to provide means for adjusting the stop position anywhere, without limit, to suit required conditions or preference of the driver.

Many joint constructions now available are subject to binding or locking if the adjacent support parts are out of alignment, either vertically or horizontally. Such misalignment is not uncommonly caused by an accidental bending of parts or by the need to secure one or more of the anchor elements in a displaced position relative to its optimum position.

It is an object of the invention to provide a joint which will work freely and effectively even if the adjacent parts are disposed considerably out of alignment, either vertically or horizontally.

Another object is to provide a mirror mounting which is sturdy enough to hold the mirror steady under all driving conditions and yet which has sufficient resiliency to resist wear and misadjustment.

Another object is to provide a mirror mounting which is simple in construction and readily adjusted by ordinary tools which are readily available.

Another object is to provide a hinge joint construction which will have an extremely long wear life without replacement of parts.

The above and other objects, advantages and features of novelty will be apparent from the following description of exemplary embodiments, when considered in connection with the accompanying drawings thereof, in which.

As shown in the drawings, a truck 10 having a door 11 with a window 12 has installed thereon a mirror mounting which is generally indicated by the letter M. The mirror assembly is shown as being mounted on the door by base anchorage supports secured above and below the window but so far as the present invention is concerned the anchorages could be elsewhere, as on the door frame or other convenient location. Also the anchorage is shown to include long arms and a vertical brace to place the mirror far out alongside, the particular installation shown being known as a West Coast mirror, but this again is for illustrative purposes and is not a part of the present invention.

The anchorage shown includes upper fore or front anchor or supporting arm of strut 15 and upper aft or rear anchor or supporting arm or strut 16 secured to an anchor plate 17—here made integral with and bent out from it ends—which is secured above the window, as by bolts or screws 18. The arms 15 and 16 converge longitudinally at their outer ends so as to stand in vertically overlapping relationship and are provided with apertures so as to be incorporated in the hinge joint with which the present invention is concerned. The anchorage also includes corresponding lower parts mounted below the window, there being lower front arm 15′, lower rear arm 16′, anchor plate 17′ and securing screws or bolts 18′. A diagonal brace 19 is secured to the anchor plate by a set screw 20 and has an apertured end 19a secured by a clamp 21 to the arm 15.

Upper and lower mirror support arms 25, 25′, respectively, have their inner ends apertured and connected in the hinge joint assemblies, these arms carrying between them, as on bracket arms 27a, a mirror 26 secured thereon by clamp pivot connections 27, 27′ which provide frictional adjustment of the mirror on a vertical axis at selected locations along the support arms. These connections 27, 27' also provide fore and aft adjustment, as by a slot and clamp bolt connection in the rearwardly extending arms 27a. For rigidity, for protection of the mirror, and as a handle, a vertical guard bar 28 is secured to the outer ends of the arms 25, 25', as by being formed integrally with the arms, as shown.

Coming now to the hinge joint assembly which forms the subject of the present invention, there is an upper hinge unit 30 and a lower hinge unit 31, either one or both of which may be of the type to be described. If only one hinge unit is of the detent type, the other hinge unit can be a single hinge arrangement with enough friction and snugness to fit tightly without loose motion or rattling. If the installation has only one set of support-anchor arms the improved hinge unit will, of course, be used.

Figure 1:
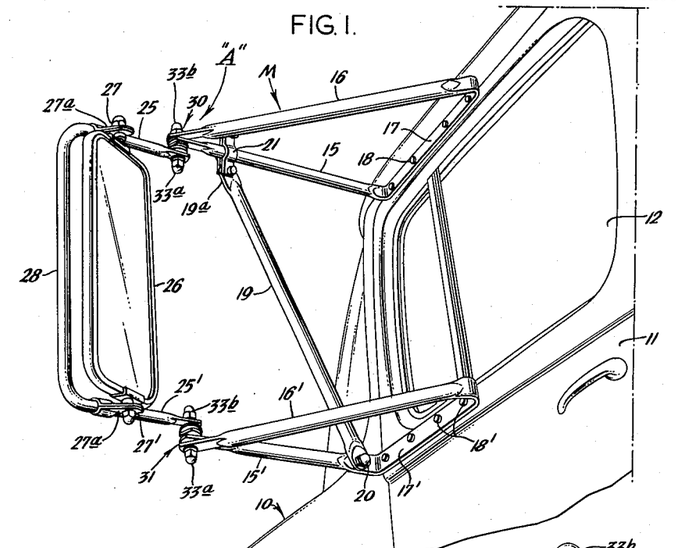
FIG. 1 is a side perspective view of a mirror mounting on a truck.
Figure 2:
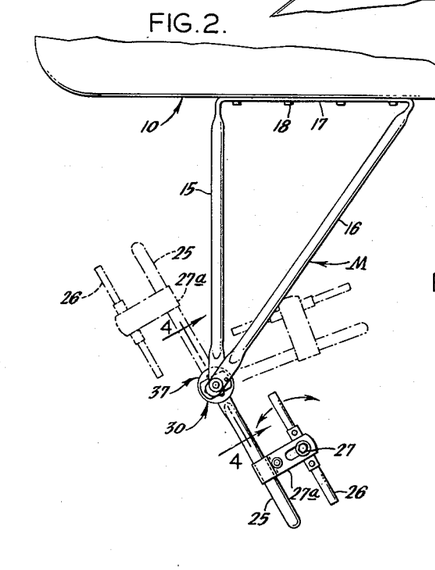
FIG. 2 is a top plan view of the mounting shown in FIG. 1.
Figure 3:
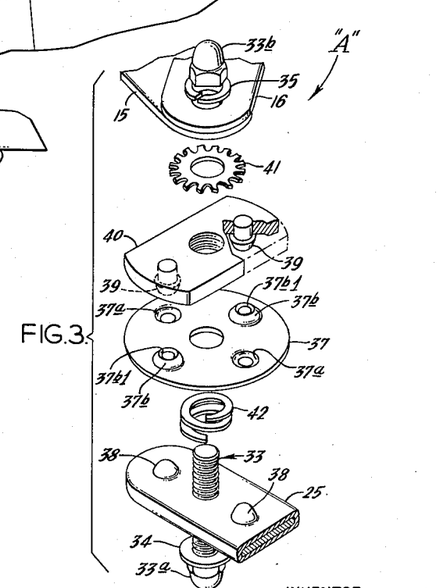
FIG. 3 is an enlarged exploded isometric view of the parts of the upper hinge joint of FIGS. 1 and 2 of what will be referred to as the "A" embodiment.
Figure 4:
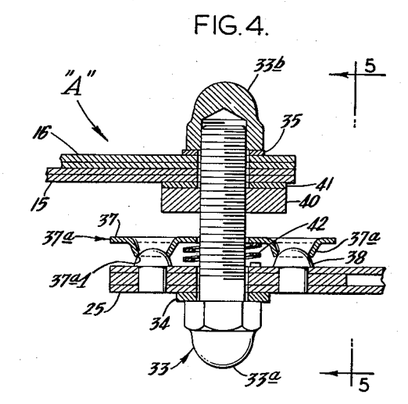
FIG. 4 is an enlarged vertical section taken on the line 4—4 of FIG. 2.
Figure 5:
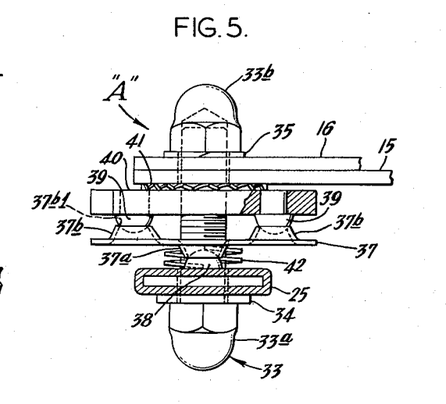
FIG. 5 is a side elevation taken on the line 5—5 of FIG. 4.

The first form of hinge joint is referred to as the "A" modification and herein is specifically shown as the joint 30. A double-headed hinge pin or bolt 33 connects the apertured ends of the anchor arms 15, 16 and the support arm 25. The hinge bolt has a fixed a head 33a at the lower end and a nut 33b threaded on the upper end, both for present purposes being referred to as heads because they clamp the hinge parts together between them.

A flat washer 34 is disposed between the head 33a and the support arm 25 and a lock washer 35 is disposed between the nut 33b and the upper anchor arm 16 (here the rear arm, although it may be either front or rear).

Incorporated in the joint are means providing tilting movement on diametrically spaced bearing-like elements about angularly offset transverse axes, here ninety degrees apart, which provide tilting movement of a generally universal type to avoid binding. One set of such bearing-like sets of elements is formed in a detent joint arrangement along one transverse axis so as to be separable when the associated parts are turned relatively to each other in a circumferential direction.

In detail, there is provided on the bolt a springy detent plate 37 which is provided on one side (the upper side here) with axially extending projection-receiving elevations or protuberances 37a having peak recesses or sockets 37a1 which receive detent projections or ball-headed elements 38 secured on the support arm 25. They may be formed as hardened heads on rivets or screws secured in the arm 25.

On its other or upper side the spring plate 37 is provided with conical elevations or protuberances 37b having peak recesses or sockets 37b1 which seat the projections or ball-headed elements 39 secured on an adjustment plate 40. Again, the projections 39 may be formed as hardened heads on rivets or screws secured in the plate 40.

The projections 38 and elevations 37a are arranged in a pair on one diameter or transverse axis and the projections 39 and the elevations 37b are arranged on another diameter or transverse axis which is angularly offset (here ninety degrees or at right angles) with respect to the first transverse axis.

The adjustment plate 40 is arranged to be turned to various angular positions relative to the anchor arms and there locked so as to provide a fixed outer locking location for the mirror support. As here shown, the plate is threaded on the bolt 33 with a lock washer 41 thereabove and when the nut 33b is loosened the plate 40 can be turned to any desired position. If the plate 40 is made fast on the bolt 33, as by being tightened on a shoulder thereof or otherwise the plate is turned by engaging it by its head; otherwise the plate is turned by engaging it with a tool such as a wrench.

One of the sets of bearing joints is required to serve only as such while the other set of bearing joints not only serves this purpose but in addition serves as a locking detent arrangement. In order to assure that only one set serves the dual purpose it is arranged that the other set, here similarly made, will offer greater resistance to turning. Here the upper set is formed so that the projections 39 enter more deeply into the elevated recesses 37b1 than do the projections 38 in the recesses 37a1.

With the present arrangement the greatest axial force is exerted when the projections 38 ride up on the projections 37a to drop into the recesses 37a1, that is, when the mirror is locked in its outer position for use, and there is much less axial force when the projections move off the elevations when the mirror is moved inward. This is a very desirable arrangement but there is a possibility that there will be undue looseness in the inswung position, especially if the joint is adjusted for low tension on the spring plate 37. To avoid this a compression spring 42 is provided between the spring plate 37 and the support arm 25. Obviously it could be placed between the arm 25 and the head 33a. It will also be obvious that if a nut is used in place of the bolt head 33a the tension on the joint can be varied simply by turning this nut. Otherwise the tension is adjusted by turning the plate 40 on the bolt to secure the desired tension on the plate 37 and then turning it to the desired circumferential locking position and tightening the nut 33b to lock it in position.

The holes in the arms 27a, 27a are made oversize, as stated above, to provide some angular adjustment relative to a vertical axis.

In operation, referring to the first form or "A" embodiment, and assuming that the mirror is located and locked in the outer use position, it can be swung in by hand or by chance accidentally, as by passing an obstruction. When it is swung in the detent projections 38 will leave the recesses 37a1 of the protuberances 37a and the parts will swing fairly freely, some frictional resistance being maintained in the joint by the compression spring 42 and also by the springy detent plate 37 provided that the detent projections maintain engagement with it.

To replace the mirror in its use position it is pushed back out until the detent projections enter the protuberance recesses. This can be determined by the increased resistance to turning and by the clicking sound made when the projections drop into the recesses.

The hinged joint support provided by the present invention may be assembled as follows: Referring to form "A" and FIGS. 1 to 5, the bolt 33 is inserted in the hole of one of the mirror support arms 25 and 25'. If there is a like joint support at the top and bottom the same procedure is used for each. A spring 42 is placed on the stem of the bolt which projects through the hole. It will be assumed that the bolt has a fixed head or that a nut head, if used, will be run up on the bolt stem or shank. The spring plate 37 is then put on and its recesses 37a1 placed on or above the projections 38 carried by the arm 25. The plate 40 is screwed down on the bolt or the bolt screwed into the plate until the proper tension is obtained, the projections 39 being left in the recesses 37b1 of the spring plate 37. The joint mounting is now a self-retaining unit carried by an arm 25 and if there are two such units they will be carried with and by the mirror support 25, 25', 28 as a sub-assembly ready to be mounted on the arms 15, 16 or 15', 16', or both, which are mounted on the vehicle.

To mount this sub-assembly on the vehicle it is only necessary to place the lock washer 41 on the bolt stem above the plate 40, place the holes of the arms 15, 16 on the bolt and screw on the nut 33b. The mirror arms are placed in the desired position and the nut 33b is tightened. If a different position is wanted it is only necessary to loosen the nut 33b (or nuts 33b at both joints), move the arms 25, 25' and mirror into a desired position and tighten the nut (or nuts) 33b.

Looked at another way, the main elements of the joint are always disposed in a predetermined circumferential position relative to the supported member or arm 25 (or arms 25, 25') but the assembly can be set and fastened non-turnably in any desired turned position on the vehicle-mounted supporting members or arms 15, 16. This provides a great convenience in manufacture, shipping, installation and use.

Tension in the joint can be adjusted by regulating the compression on the springy detent plate 37 in the manner heretofore described. If the lower head 33a is a threaded nut instead of a fixed part of the bolt 33 the adjustment will be maintained by the flat washer 34. The bolt will not turn because the upper end is held in place on the anchor arms by the nut 33b and related parts. If two nuts are used the bolt must be held against turning by other means, as for example, by having the hole in the spring detent plate 37 splined on the bolt.

The manner of adjusting the outer use position by turning the adjustment plate 40 and relocking it in position has already been described.

It will be clear that since there is only one locking position there is never any danger that the mirror will be pushed out to an improper position, with any care at all.

There may be many modifications and several, in addition to the first form, are shown. They are designated as "B," "C," "D," "E," and "F," respectively. Identical parts, such as the arms when not altered, will be identified by the same reference characters; with an appropriate prefix letter "B," "C," "D," "E" or "F" when altered; and by new reference characters when entirely different in character.

The "B" form (FIGS. 6 and 7) differs from the "A" form mainly in having the location of the projections and recesses reversed. The arms 15, 16 and 25 are the same as before; the hinge bolt 33 is the same as before; the washers 34, 35 and 41 are the same as before; and the spring 42 is the same as before. However, the projections B-38 and B-39 are formed on the spring plate B-37 and the recesses B-37a1 and B-37b1 are formed in the support arm B-25 and adjustment plate B-40 respectively.

Figures 6, 7:
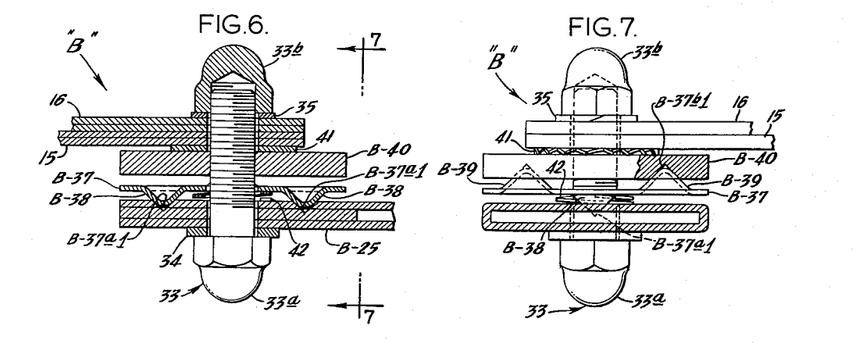
FIG. 6 is a view like FIG. 4 but showing a modified form of joint designated as the "B" embodiment.
FIG. 7 is a side elevation taken on the line 7—7 of FIG. 6.

The plate B-40 and the arm B-25 are made of sufficient width to prevent the projections B-38 and B-39 from dropping off. The lower mating parts, as before, have shallower engagement than the upper ones so as to act as detents as well as bearings, the upper mating parts being deeper so as to avoid separation and to act as bearings only.

The "B" form has less joint compression in the locked use position than in the unlocked position, the converse of the "A" form, but still has the one-point-lock, the adjustment of the use position and the universal tilting action and is a very satisfactory form, as fully proved by test operation.

The "C" form (FIGS. 8 and 9) is similar to the "A" form in that it again has lower apertured protuberances C-37a on the spring detent plate C-37 for the projections 38 on arm 25; but the upper apertured protuberances C-37b receive pins C-39 carried by the adjustment plate C-40 instead of ball-headed projections. In addition, a resilient relatively thick pad, as of rubber-like material 45 (50 to 60 durometer rubber having proved very satisfactory) is interposed in the joint.

Figure 8:
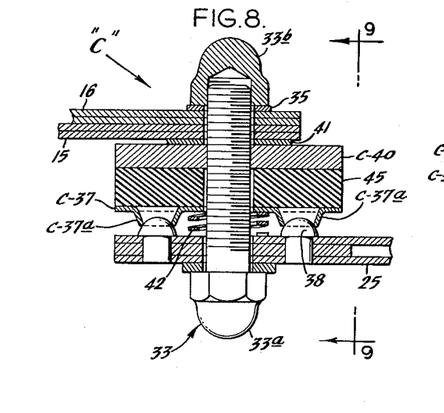
FIG. 8 is a view like FIG. 4 but showing another modified form referred to as the "C" embodiment.
Figure 9:
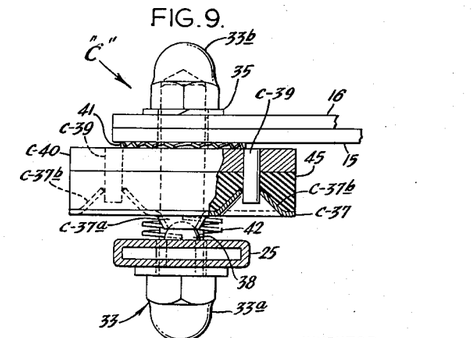
FIG. 9 is a side elevation on the line 9—9 of FIG. 8.

In the "C" form the resilient pad 45 keeps the projections 38 against the spring detent plate B-37, even in the off position, and the spring 42 positively assures that the upper projection-recess joints will not separate. The essential action is maintained, as before.

Figure 10:
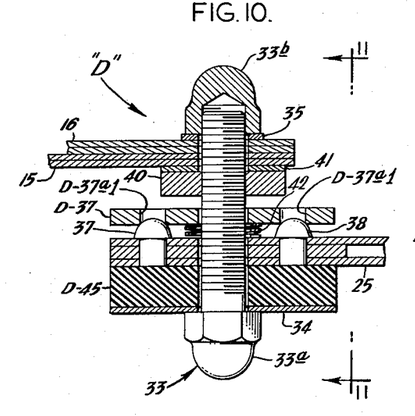
FIG. 10 is a view like FIG. 4 but showing another modified form referred to as the "D" embodiment.
Figure 11:
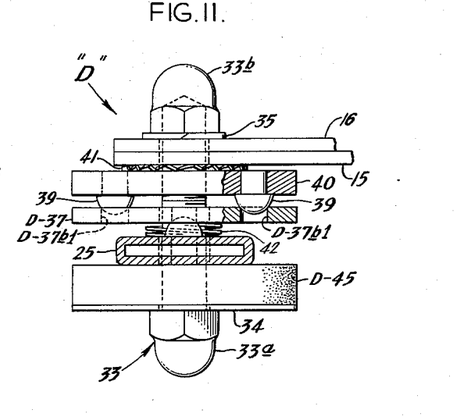
FIG. 11 is a side elevation taken on the line 11—11 of FIG. 10.

In the "D" form (FIGS. 10 and 11) the resilient pad D-45 is placed below the arm 25 and above the head 33a and its washer 34 but still imposes compression on the joint. Here the spring plate D-37 is made of generally flat planar configuration with detent-bearing holes D-37a1 for the lower projections 38 and with bearing holes D-37b1 for the upper projections 39 of the adjustment plate 40. Here the essential action is the same as in the other forms, but like the "B" form, the compression is least when the parts are locked in the use position. However, the thick resilient pad accommodates for this and assures secure locking in the use position.

The "E" form (FIGS. 12-14) is similar to the "A" form in that it has a spring detent plate E-37 with projections E-37a and E-37b on opposite sides, the projections having recess sockets E-37a1 and E-37b1 with through apertures for projections E-38 and E-39 respectively. The projections E-38 are round-headed for movement into and out of the detent sockets; but the projections E-39 are formed as pins which extend through the apertures of the sockets, as in the "C" embodiment, to provide turning or rocking movement but to prevent relative rotation on this side of the detent plate.

Figure 12:
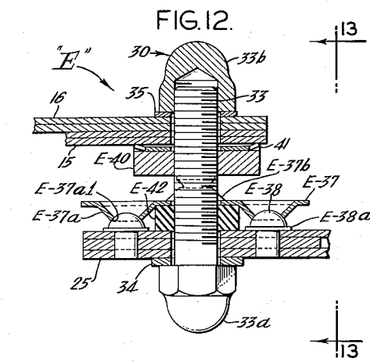
FIG. 12 is a view like FIG. 4 but showing a form which will be referred to as the "E" embodiment.
Figure 13:
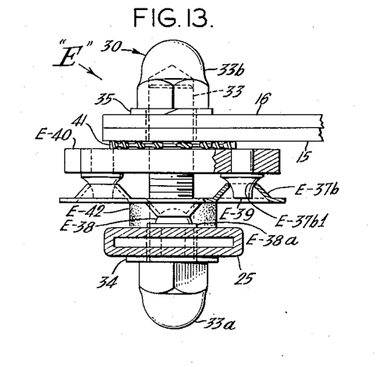
FIG. 13 is a side elevation taken on the line 13—13 of FIG. 12.
Figure 14:
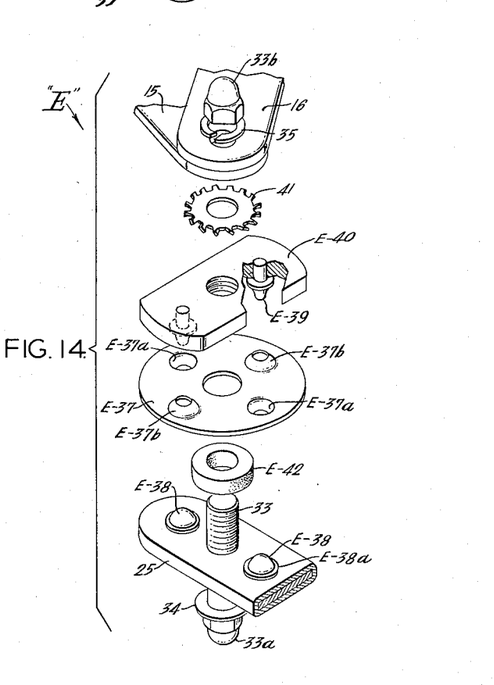
FIG. 14 is an exploded isometric view of the parts shown in FIGS. 12 and 13.

The detent plate is made as hard as the spring requirements will permit and is made identical on both sides so that a second side may be presented to the shiftable projections E-38 by turning the plate over after the sockets of the first side become worn. The projections E-38 which have no secondary limiting requirements can, of course, be made as hard as desired and will have no appreciable wear.

Also in the "E" form the spring 42 has been replaced by an elastomeric washer E-42, as of rubber, which serves to prevent vertical loose motion when the projections leave the sockets and also serves to impose frictional resistance to relative rotation between the parts. A coil spring resists free vertical movement but has very little resistance against relative rotation. The rubber washer provides both actions. In assembling the rubber washer is pre-compressed when the detent joints are engaged so it will expand adequately when the shiftable detent joint parts are separated.

The rest of the structure is like that of the first form and the same reference characters are used.

The "F" form (FIGS. 15-17) is similar to the "A" form in that it has a spring detent plate F-37 with projections F-37b on the upper side, the projections having apertures F-37b1 to take pins F-39 of a plate F-40 like the "C" and "E" forms.

Figures 15, 16, 17:
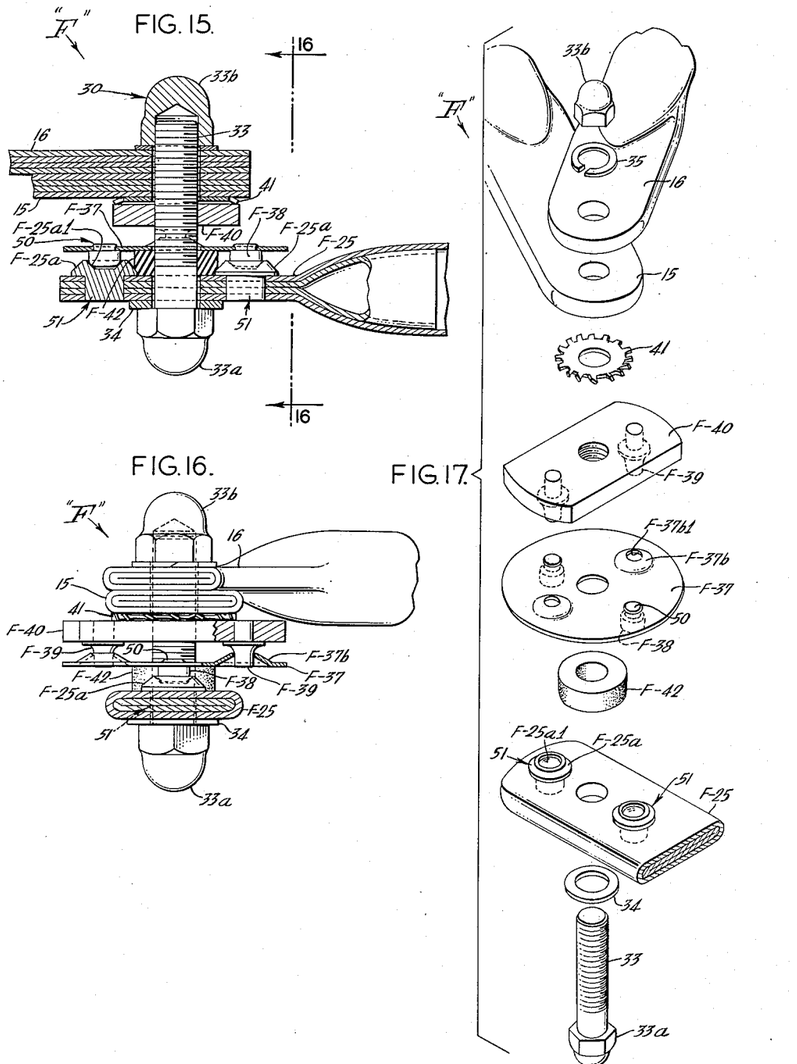
FIG. 15 is a view like FIG. 4 but showing a form which will be referred to as the "F" embodiment.
FIG. 16 is a side elevation taken on the line 16—16 of FIG. 15.
FIG. 17 is an exploded isometric view of the parts shown in FIGS. 15 and 16.

On the lower side the detent plate is provides with projections F-38 formed on studs 50 which are inserted in holes in the detent plate and firmly riveted in place.

The arm F-25 is provided with studs 51 having projections or heads F-25a with sockets F-25a1 to receive the heads F-38 of the detent plate F-37.

The studs 50 and 51 are hardened first and then assembled, the studs 50 being riveted in the holes of the detent plate because it is thin and spring-hard; but the hardened studs 51 are forced into or staked in undersized holes in the relatively soft material of the arm F-25. It will be noted that the arm F-25 at the end has four thicknesses of material, being formed by forcing an inner short tube in the outer long tube and flattening them together.

By being formed and hardened separately the studs, and especially their head portions, can be made extremely hard so as to provide almost an unlimited length of wear life in use, both interacting or relatively rotatable parts being hardened. By having both interacting parts made extremely hard—instead of only one—the wear life is very greatly lengthened.

The heads F-38 are flattened and chamfered around their outer wear edges and the socket heads F-25a are inclined on both sides of the annular rim to provide suitable interacitng slide surfaces but with good holding effect when the heads are seated in the sockets.

The rubber washer F-42 is provided as in the "E" form.

One reason for putting the studs 51 of the socket elements F-25a1 on the arm 25 and the studs 50 of the head elements F-38 on the detent plate is that the broader projection F-25a of the stud 51 provides a large surface to be engaged by a plunger to force and guide the stud into the undersize hole in the arm whereas the shank of the stud 50 merely has to be inserted and riveted in the hole of the detent plate. It would be possible to reverse the arrangement.

Another reason for putting the studs 50 with headed elements F-38 on the spring detent plate is that the shank of the studs 50 is of small diameter and does not materially weaken the detent plate; whereas the large diameter shank of the studs 51 can well be accommodated in the arm F-25.

As an idea of the relationship and hardness of the parts, the detent plate F-37 is made of A.I.S.I. C-1095 steel heat treated to Rockwell C. 46-48; and the studs 50 and 51 are made of C-1006 to C-1015 steel, cold headed, and case hardened .015" to .020" depth to 65-67 Rockwell C. and stabilized at 350-400 degrees F. The inside and outside annular inclined chamfered surfaces of the recessed head of the stud 51 have an inclination of about 45 degrees; and the chamfered corners of the head of the stud 50 are rounded on about a .050" radius. The studs having the heads F-39 will be of material and hardness comparable to that of the studs 50 and 51.

It is thus seen that the invention provides a simple, convenient and dependable hinged joint support, as for a rear view mirror mounting, which is easy and economical to manufacture and install.

While certain embodiments of the invention have been described for purposes of illustration, it will be understood that there may be various other embodiments and modifications within the general scope of the invention.

I claim:

1. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together.

2. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, said detent plate being resilient to provide axial pressure on said bearing joints when the bearing joint elements are in interengaging position.

3. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, at least one set of said bearing joints comprising raised socket elements and cooperating projection elements cooperating with the raised socket elements.

4. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, and further resilient means in said hinge joint urging apart the elements of at least one set of said bearing joints.

5. A hinged joint support for relatively turnable supporting and supported members, as for a mirror mouting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, and further resilient means in said hinge joint urging apart the elements of at least one set of said bearing joints, said last-named resilient means including a layer of elastic material interposed in the hinge joint.

6. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, at least one set of said bearing joints including bearing elements raised above the plane of the part on which they are carried to provide the rocking movement about the diameter on which the set of bearing joints is located.

7. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, said hinge joint including a plate member carrying elements of one set of bearing joints and mounted on said hinge pin for adjustable circumferential movement relative to one of said supporting and supported members to vary the locking position in use.

8. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, said hinge joint including a plate member carrying elements of one set of bearing joints and threaded on said hinge pin for adjustment axially of the hinge pin to vary the axial pressure on said bearing joints and for adjustment circumferentially, toegther with related parts relative to the supporting member to vary the locking position of the supported member in use.

9. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, said detent plate having projections on at least one side forming bearing elements for one set of bearing joints.

10. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, one set of bearing joints including pins on one part disposed in holes of an adjacent part.

11. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, and an elastic pad interposed in said hinge joint between said detent plate and an adjacent part carrying bearing elements of one set of bearing joints.

12. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, and an elastic pad interposed in said hinge joint between said detent plate and an adjacent part carrying bearing elements of one set of bearing joints, one set of bearing joints including pins passing through said pad of elastic material into holes of an adjacent part.

13. A hinged joint support for relatively turnable supporting and supported members, as for a mirror mounting on a vehicle, comprising in combination: a supporting member secured to a base anchorage, a supported member, a double-headed hinge pin passing through holes in said members to provide a main hinge joint, a detent plate loosely carried on said hinge pin between said members, angularly offset paired sets of rocking bearing joints between said detent plate and said members, said bearing joints of each set having interfitting relatively turnable joint elements located on a common diameter through the axis of the hinge pin and on opposite sides of said axis, said bearing joint elements being of such depth axially as to provide clearance space on both sides of said detent plate except at the bearing joints to permit angular movement about each set of angularly offset pairs of bearing joints, one set of bearing joints providing separation of the bearing joint elements by relative circumferential movement between the joint elements to act as detents as well as rocking bearings, and means included in said hinge joint imposing axial pressure on said sets of bearing joint elements urging them together, and a resilient element disposed on said hinge pin between a head on the pin and one of said supporting and supported members.

14. A mirror mounting as set forth in claim 1, in which said bearing joints include projection and socket elements on opposite sides of a bearing detent plate, the projections on one side of the detent plate entering to less depth in their sockets than on the other side of the plate so that the shallower bearing parts will separate by relative circumferential movement of adjacent parts while the deeper parts on the other side will not separate.

15. A hinged joint support, as for an outside rear view mirror mount, comprising in combination, a supporting member, a supported member, and a hinge joint between said members providing circumferential turning movement of said supported member and locking engagement between said members in a predetermined circumferential position, said hinge joint including a double-headed hinge pin, a detent plate carried by said hinge pin and interposed between said supported and supporting members, angularly offset paired sets of diametrically opposite bearing joints between said plate and parts carried with said members, said bearing joints each including a socket element and a projection element, one set of bearing joint elements being separable by relative angular and axial movement between the detent plate and an element-carrying part on one side of the detent plate to constitute detent bearing joints, said hinge joint including means imposing axial pressure on said sets of bearing joints.

16. A hinged joint support as set forth in claim 15, in which said sets of bearing joints are located on diametral axes which are angularly offset by ninety degrees on opposite sides of said detent plate and in which said detent plate is axially resilient to provide at least part of said means imposing axial pressure on said sets of bearing joints.

17. A hinged joint support, as for an outside side view mirror mount, comprising in combination: a supporting member, a supported member, and a hinge joint between said members providing circumferential swinging movement of the supported member relative to the supporting member and locking of the circumferential movement in a predetermined circumferential position, said hinge joint including a hinge pin having a head on both ends, a detent plate mounted on said hinge pin adjacent said supported member, a second plate threaded on said hinge pin above said detent plate, a first set of rocking bearing joints between said detent plate and said supported member, said first set of bearing joints being located on a diameter through said hinge pin axis and on opposite sides of said axis, a second set of rocking bearing joints between said detent plate and said second plate, said second set of bearing joints being located on a diameter through said hinge pin axis and on opposite sides of said axis, said second set of bearing joints being on a diameter which is located ninety degrees from the diameter of the first set of bearing joints, means in said hinge joint for applying resilient axial pressure on said bearing joints, the elements of one set of bearing joints being separable by relative circumferential movement between said detent plate and an adjacent part carrying bearing joint elements means in said hinge joint for applying axial pressure urging said detent plate away from a part on one side carrying bearing joint elements, the two sets of bearing joints being located in a circumferentially fixed position relative to said supported member, and means for securely clamping said second plate in a selective circumferentially turned position relative to said supporting member, the arrangement providing for securement of the entire assembly on the supported member and the subsequent attachment of the assembly in selected positions on said supporting member without changing the relationship between parts carried with said supported member.

18. A hinged joint support as set forth in claim 1, in which said detent plate is formed with protuberances on each side formed with end bearing seats, and the formation on each side being identical except for the angular spacing between pairs of protuberances on opposite sides.

19. A hinged joint support as set forth in claim 1, in which said detent plate is formed with protuberances having end holes having ball seats on each side and the formation being identical on each side except for the angular spacing between pairs of protuberances on opposite sides.

20. A hinged joint support as set forth in claim 1, in which said bearing joints on one side of the detent plate include means for holding the plate against turning relative to an associated part on the other side, and including parts which turn circumferentially relative to each other to separate from axially high bearing points and to move to a position of less axial tension, and axially resilient means having an extensive flat annular friction surface of elastomeric material engaging the relatively movable part to inhibit free circumferential movement between the parts.

21. A hinged joint support as set forth in claim 20, in which said axially resilient means comprises a washer of elastomeric material.

22. A hinged joint support as set forth in claim 1, in which said separable set of joints comprises at each joint a first headed element with a male projection and a second headed element with an end recess to receive said male projection, both of said headed elements having interengaging surfaces which are very hard in the range above 50 Rockwell C.

23. A hinged joint support as set forth in claim 22, in which said headed elements are formed on pre-hardened studs which are staked in the detent plate and the adjacent members respectively.

24. A hinged joint support as set forth in claim 22, in which said first headed element is formed with a flat end with round edges and said second headed element is formed with a flat-bottomed recess surrounded by an annular wall having inclined inner and outer surfaces.

No references cited.

UNITED STATES PATENT OFFICE
CERTIFICATE OF CORRECTION

Patent No. 3,119,591 January 28, 1964

Alexander J. Malecki

It is hereby certified that error appears in the above numbered patent requiring correction and that the said Letters Patent should read as corrected below.

Column 2, line 52, for "of" read -- or --; column 3, line 14, for "single" read -- simple --; line 23, strike out "a", second occurrence; same column 3, line 68, for "the plate is turned by engaging it" read -- it can be turned by turning the bolt --; column 6, line 41, for "provides" read -- provided --; line 66, for "interacitng" read -- interacting --; column 8, line 53, for "mouting" read -- mounting --; column 10, line 7, for "toegther" read -- together --.

Signed and sealed this 30th day of June 1964.

(SEAL)
Attest:

ERNEST W. SWIDER
Attesting Officer

EDWARD J. BRENNER
Commissioner of Patents